United States Patent [19]

Priaroggia

[11] Patent Number: 4,676,590

[45] Date of Patent: Jun. 30, 1987

[54] PRESSURE RESISTANT SUBMARINE OPTICAL FIBER CABLE

[75] Inventor: Paolo G. Priaroggia, Milan, Italy

[73] Assignee: Societa' Cavi Pirelli S.p.A., Italy

[21] Appl. No.: 723,265

[22] Filed: Apr. 15, 1985

[30] Foreign Application Priority Data

Apr. 19, 1984 [IT] Italy ................ 20620 A/84

[51] Int. Cl.⁴ .............................................. G02B 6/44
[52] U.S. Cl. .............................. 350/96.23; 174/70 R
[58] Field of Search ................. 174/70 R; 350/96.23

[56] References Cited

U.S. PATENT DOCUMENTS

| | | | |
|---|---|---|---|
| 3,710,006 | 1/1973 | Davis | 350/96.23 X |
| 4,143,942 | 3/1979 | Anderson | 350/96.23 |
| 4,153,332 | 5/1979 | Longoni | 350/96.23 |
| 4,574,192 | 3/1986 | Kitagawa et al. | 350/96.23 X |

FOREIGN PATENT DOCUMENTS

| | | | |
|---|---|---|---|
| 2021282 | 11/1979 | United Kingdom | 350/96.23 |
| 1572299 | 7/1980 | United Kingdom | 350/96.23 |
| 1598540 | 9/1981 | United Kingdom | 350/96.23 |

*Primary Examiner*—John Lee
*Attorney, Agent, or Firm*—Brooks Haidt Haffner & Delahunty

[57] ABSTRACT

A submarine cable with optical fibers which prevents damage to the fibers due to water pressure without the use of an external armor. The cable has a central strand which provides the cable tensile strength and which is surrounded by helically wound tubes which enclose the optical fibers. A layer of plastic material may be provided intermediate the tubes and the strand and the tubes are covered by a layer of plastic material in contact with the tubes. The layer of plastic material contacting the tubes is closely surrounded by a thin metal sheath which, in turn, is closely surrounded by a layer of plastic material. The tube and any spaces radially inwardly of the tubes are filled with a practically incompressible fluid, such as a grease or jelly. The strand may include a wire of good electrical conductivity which, with the sheath, may be used to supply electrical power to repeaters along the cable length.

9 Claims, 4 Drawing Figures

PRESSURE RESISTANT SUBMARINE OPTICAL FIBER CABLE

The present invention relates to a telecommunication, optical fiber, submarine cable particularly suitable for laying and operation at great depths.

A telecommunication, optical fiber, submarine cable is subjected to the hydrostatic pressure exerted by the surrounding water and therefore, is subjected to compressive stresses in the radial direction. Said compressive stresses become greater as the depth is increased and are effective for the entire life of the cable. The compressive stresses on the cable in the radial direction cause the risk of a collapse of the cable.

The collapsing risk is particularly dangerous with telecommunication, optical fiber, submarine cables because the optical fibers are very delicate. In fact, the optical fibers are not only fragile and consequently, can easily break, but also, cause an attenuation of the transmitted signals when subjected to mechanical stresses of a small magnitude.

It follows that if collapsing of a small magnitude should arise in the structure of a telecommunication, optical fiber, submarine cable, the cable is put out of use for the reasons stated since, unavoidably, the optical fibers would be subjected to mechanical stresses which are always dangerous.

In order to reduce said risks, the telecommunication, optical fiber, submarine cables are provided with a metallic armor resistant to mechanical stresses around the zone where there are the optical fibers, and when the depth at which the cable is laid and operates is increased, the dimensions of said metallic armor are increased.

The presence of a metallic armor which surrounds and protects the optical fibers, affects negatively the flexibility of the cable since said armor is far from the bending neutral axis which, as is known, coincides with the longitudinal axis of the cable itself. As the dimensions of the armor increase for greater laying and operating depths, the greater is the negative effect on the flexibility of the cable. Telecommunication, optical fiber, submarine cables of great volume per meter in length, i.e. cables of heavy weight with consequent difficulty in the laying operations, are known.

The great quantities of metal per meter of length present in the known telecommunication, optical fiber, submarine cable make the cables themselves sensitive to the danger of "blinding" the optical fibers owing to the greater possibility that hydrogen, coming from metal, can come into contact with the optical fibers causing the "blinding" phenomenon.

British Pat. No. 2,021,282 and Australian Pat. No. 74,368 A/81 disclose known optical fiber submarine cables provided with a metal structure resistant to mechanical stresses, which metal structure surrounds the plurality of optical fibers of the cable which are arranged around a central core and are enclosed within a water tight metal sheath. Consequently, such cables suffer from the previously stated drawbacks.

An object of the present invention is to provide telecommunication, optical fiber, submarine cables which are not subject to the collapsing risks and yet avoid the presence of metallic armors, resistant to mechanical stresses, disposed around the zone occupied by the optical fibers thereby reducing, at the same time, the cable weight, the risks of "blinding" the optical fibers and optimizing the cable flexibility.

The principal object of the present invention is a telecommunication, submarine cable comprising a plurality of optical fibers arranged around a central core enclosed within a water tight metal sheath, characterized by the fact of comprising:

(a) an armor disposed in the radially innermost position relative to the cable, the axis of said armor coinciding with the cable axis and said armor being constituted by a compact anti-torsional strand, the spaces between the wires forming said strand being filled with an incompressible fluid;

(b) a plurality of tubes being disposed on the outermost surface of the armor, said tubes being suitably spaced from one another and following a substantially helical configuration around said armor, being filled with an incompressible fluid and loosely housing at least one optical fiber;

(c) a first layer of plastic material extruded on said armor and said tubes, the radially innermost surface of said first layer having a complementary shape with respect to the surface of the armor-tubes assembly so that each clearance space is filled with the materials of said first layer; and (d) no radially outer armor resistant to mechanical stresses and surrounding the zone where the optical fibers are disposed.

Moreover, a water tight metal sheath is disposed around the first layer in close contact with the radially outermost surface of this latter.

A covering layer of plastic material can be present on the compact anti-torsional strand, constituting the cable armor, and it is closely secured to this strand without leaving free clearance spaces.

In this latter case, the tubes, filled with an incompressible fluid and loosely housing an optical fiber, are wound on said covering layer of plastic material, and the first layer of plastic material of the cable is extruded on said covering layer and said tubes, the radially innermost surface of said first layer having a complementary shape with respect to the surface of the covering layer-tubes assembly so that each clearance space is filled with the material of said first layer.

In the present specification the term "incompressible fluid" means liquid substances, preferably viscous and of high viscosity, but excludes gases.

The armor, disposed at the radially innermost position of the cable and constituted by a compact anti-torsional strand, is dimensioned to withstand substantially all the tensile stresses applied to the cable during its laying. Moreover, the cable armor can comprise a longitudinal metallic element of high electrical conductivity for feeding optoelectronic repeaters of the signals transmitted by the optical fibers which may be disposed along the cable.

Other objects and advantages of the present invention will be apparent from the following detailed description of the presently preferred embodiments thereof, which description should be considered in conjunction with the accompanying drawings in which:

FIG. 1 illustrates, in transverse section, a telecommunication, optical fiber, submarine cable according to the present invention which is particularly suitable to be laid at great depths, "great depths" meaning greater than 1000 meters. At such depth, the water exerts a pressure of about 100 Kg/cm$^2$ on the cable.

Figure 1:
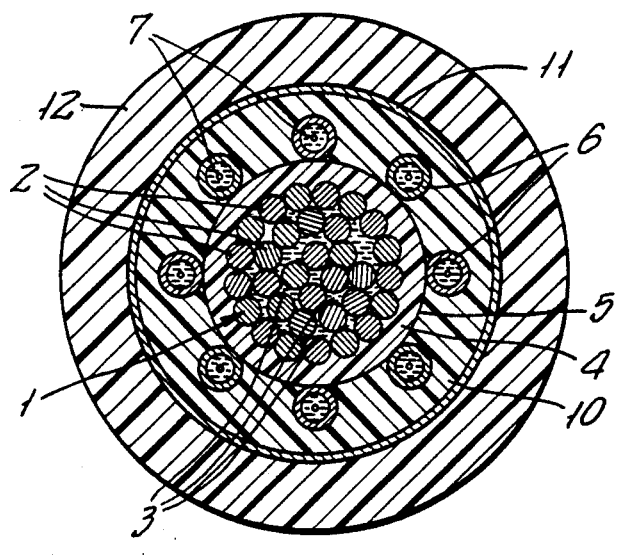
FIG. 1 is a cross-section taken transversely of the axis of a telecommunication, optical fiber, submarine cable according to the present invention.

As shown in FIG. 1, proceeding from the inside toward the outside, the cable has an armor 1 disposed at and occupying, the radially innermost position of the cable. The axis of the armor 1 coincides with the cable axis and the armor is selected, and therefore, sized, in such a way as to withstand substantially all the tensile stresses exerted on the cable during its laying.

The armor 1 is constituted by a compact, antitorsional strand formed by a plurality of helically wound wires 2 which are arranged in overlapped coaxial layers with the winding direction of the wires of one layer opposite to that of the adjacent layers. Said wires 2 are of a very high mechanical resistance material, for example, steel, or in the alternative, a material having a mechanical resistance comparable with steel such as the aromatic polyamide or carbon fibers, which, when such fibers are used, reduce the quantity of metal present in the cable. As used herein, the term "wires" includes threads of such fibers. When the cable is to be used at a depth of the order of 1000 meters, the armor 1 may have a diameter of 6 to 12 mm., a diameter of 8 mm. being suitable.

All the spaces 3 between the wires are filled with a practically incompressible fluid such as, for example, a petroleum jelly, a silicone grease and the like.

If the wires 2 are made of steel, the spaces 3 between the wires 2 can be reduced by providing them with sectional shapes suitable to the purposes such as, for example, a trapezoidal shape, a Z-like shape and the like.

A covering layer 4 of plastic material is disposed around the armor 1 and is constituted, for example, by a polyolefine such as polyethylene, polyvinylchloride, nylon or the like plastic material which has a low coefficient of thermal expansion. The covering layer 4 is in close contact with the strand constituting the armor 1 so as not to leave empty clearance spaces between the layer 4 and the strand. The layer 4 may have a thickness up to 1 mm., and preferably, of the order of 0.5 mm.

On the exterior surface 5 of the layer 4, which is circular in section, there are, helically wound, a plurality of tubes 6 of plastic material or metallic material which are filled with a practically incompressible fluid, such as, for example, a petroleum jelly, a silicone grease and the like and which loosely enclose at least an optical fiber 7.

The wall thickness of each tube 6 depends on the volume of the spaces which are not filled by the practically incompressible fluid and which, for any reason whatsoever, may be present within the tube. In fact, if the tubes 6 are not completely filled with the practically incompressible fluid, the tube itself must have a greater mechanical resistance to the radial compressive stresses to offset the lesser support which can be supplied to the inner wall of the tube by the practically incompressible fluid. Such tubes 6 are described in U.S. Pat. No. 4,153,332, and for a tube 6 enclosing one optical fiber, the internal diameter and external diameters of the tube 6 may, for example, be 1 mm., and 2.5 mm., respectively. However, the internal diameter may be in the range from about 0.75 mm., to about 1.5 mm., and the external diameter may be in the range from about 1.8 mm., to about 3 mm., depending on the internal diameter used.

As an alternative, the space between the inner surface of the tube, if this latter is made of plastic material, and the optical fiber is entirely occupied by a plastic material the same as or different from the plastic material forming the tube.

Figure 2:
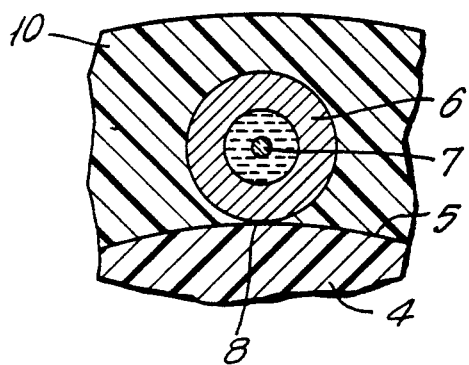
FIG. 2 is an enlarged, fragmentary cross-section of a portion of the cable shown in FIG. 1.

The tubes 6 helically wound on the covering layer 4 of plastic material are suitably spaced from one another, and for example, are equally spaced from one another as is shown in FIG. 1. The contact between the tubes 6 and the surface 5 of the layer 4 takes place along the line 8 indicated in FIG. 2.

Figure 3:
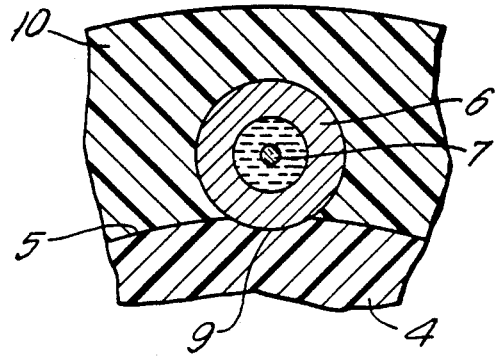
FIG. 3 is an enlarged, fragmentary cross-section, similar to FIG. 2, and illustrates an alternative embodiment.

According to an alternative embodiment illustrated in FIG. 3, the radially outermost surface 5 of the covering layer 4 is provided with grooves 9 having a helical path. In cross-section, the grooves 9 have a radius of curvature equal to that of the outer surface of the tubes 6, but have a depth which is smaller than the radius of said tubes 6 so as to carry out only a stabilization function to position the tubes 6 on the surface 5 of the layer 4. In this situation, the tubes 6 have a small portion of their outer surfaces in contact with the surface 5 along the entire length of the grooves 9.

Over the tubes 6 and the covering layer 4 assembly, there is a first layer 10 of plastic material applied by extrusion. The layer 10 of plastic material is, for example, constituted by a polyolefine such as polyethylene or polyvinylchloride, nylon and like materials having a low coefficient of expansion and the radially innermost surface of the layer 10 has a shape which is complementary with respect to the surface of the covering layer 4 and tubes 6 assembly on which said layer 10 is extruded.

Consequently, the radially innermost surface of the layer 10 closely follows the shape of the surfaces except where the tubes 6 contact the covering layer 4. In this way, any space between the tubes 6 is completely filled with the plastic material of the first layer 10. The layer 10 may have a thickness, from the inside to the outside thereof, of about 1 mm., greater than the external diameters of the tubes 6.

As shown in FIG. 1, a water-tight metal sheath 11 is around the first layer 10 and in close contact with the radially outermost surface of this latter. The metal sheath 11 has only a waterproofing function and does not constitute, nor in practice need not constitute, an armor for the cable which is resistant to the stresses both in the longitudinal direction and in the transverse direction.

The metal sheath 11 has a thickness, for example, of some tenths of a millimeter. Generally, the thickness of the metal sheath 11 has the minimum value required for construction purposes, and said thickness may remain substantially constant at whatever the depth at which the cable may be laid and operated. The metal sheath 11, for example, of aluminum, can be provided by extruding it on the first layer 10.

As an alternative, the metal sheath 11 can be provided by winding a metallic tape, for example, of aluminum, on the first layer 10 and in direct contact with the radially outermost surface of the layer 10. The longitudinal edges of the tape are placed in contact with each other and are secured together in a water-tight manner such as by means of a soldering operation or if said longitudinal edges are overlapped, by sealing them with mastics and the like.

Around the water-tight metal sheath 11, there is a third layer 12 of plastic material, for example, a polyolefine such as polyethylene, having a thickness in the range from about 2 mm., to about 5 mm., e.g. 4 mm.

Other layers not shown in the FIG. 1 can be applied around the layer 12. For example, an anti-ship-worm protection, of a type known per se, may be provided around the layer 12, but none of these other layers are intended, in practice, to provide a mechanically resistant armor for the cable.

In this way, a telecommunication, optical fiber, submarine cable according to the present invention is devoid of any radially outer mechanically resistant, fiber protecting armor which surrounds the zone where there are the optical fibers and, therefore, there is no such armor outwardly of the watertight metal sheath 11.

Figure 4:
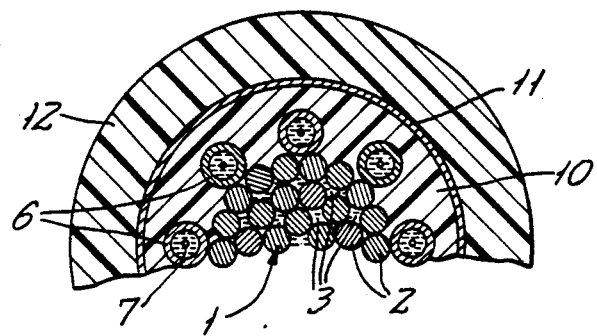
FIG. 4 is a cross-section of an alternative embodiment of the cable of the invention and is similar to FIG. 1.

In an alternative embodiment, illustrated in FIG. 4, a telecommunication, optical fiber, submarine cable according to the present invention differs from the previously described embodiments which are illustrated in the drawing only by the omission of the covering layer 4 of plastic material disposed around the compact anti-torsional strand or armor 1.

According to this alternative embodiment, the tubes 6, filled with an incompressible fluid and loosely housing at least an optical fiber, are helically wound on the compact anti-torsional strand or armor 1 and in direct contact with the outer surface of the armor 1.

In this embodiment, the cable first layer 10 of plastic material is extruded on the assembly formed by the armor 1 and tubes 6, and consequently, the radially innermost surface of this first layer 10 has a shape which is complementary with respect to the surface of the armor-tubes assembly so that any space between the tube 6 is filled with the material of said first layer 10.

The armor can comprise a longitudinal metallic element of high electric conductivity so as to have an electric conductor for feeding any optoelectronic repeaters of the signals transmitted by the optical fibers which may be arranged along the cable with electrical power, the other conductor being constituted by the metal sheath 11. For example, the longitudinal metallic element of high electric conductivity may be a copper wire embedded in or wound around the strand constituting the armor 1. If there are a sufficient number of wires 2 remaining, one of the steel wires 2 may be replaced by a copper wire.

From the previous description of some embodiments of a telecommunication, optical fiber, submarine cable according to the invention and from the considerations to be set forth hereinafter, it will be understood that, by means of said cable, the objects of the invention have been allowed.

In a telecommunication, optical fiber, submarine cable according to the present invention, the sole mechanically resistant armor present in the cable is concentrated at the radially innermost zone of the cable in the form of an anti-torsional compact strand the axis of which coincides with the axis of the cable. Said armor is sized to withstand in practice all the stresses to which the cable is subjected during its laying. By such construction, the armor resistant to the mechanical stresses to be included in a telecommunication, optical fiber, submarine cable is reduced to a minimum.

Moreover, since all the spaces between the wires forming the armor are filled with a practically incompressible fluid and since the tubes loosely enclosing the optical fibers are filled with a material or a fluid which is practically incompressible in a telecommunication optical fiber submarine cable according to the present invention, there are not, as a practical matter, any spaces free from material in its structure, with the exception of possible very small cavities which are unavoidable in the manufacture of the cable itself.

Also, for greater safety, the tubes filled with the practically incompressible fluid and loosely enclosing the optical fibers can have a thickness which will give them a mechanical resistance to the radial compressive stresses even when there are possible risks deriving from a possibly not perfect and complete filling of the tubes with the practically incompressible fluid.

Because of the previously described characteristics, it has been found that a cable according to the present invention is not subjected to risks of collapsing due to the compressive stresses in the radial direction under the action of the hydrostatic pressure whatever its value and consequently, whatever the laying depth of the cable may be.

By such structure, it is possible to avoid surrounding the cable zone where there are optical fibers with the mechanically resistant armors considered, up to now, to be absolutely necessary to avoid the risk of collapsing of the structure of the cables.

In other words, in a telecommunication, optical fiber, submarine cable according to the present invention, the combination of the minimum of mechanically resistant structure with the maximum of resistance to the compression stresses, considered up to now to be impossible to obtain for cables of this type, is surprisingly obtained.

The realizing of a water-tight sheath for the cable with a metallic layer is due to the fact that only with a metallic material is it possible to obtain the desired water impermeability, but the metallic layer forming the sheath of a cable, according to the present invention, has the minimum possible thickness consistent with its construction requirements and does not change with the depth at which the cable must be laid. Consequently, the metal sheath does not carry out, in practice, any function of mechanically resistant armor for the cable.

In addition, an optimization of the cable flexibility is obtained by reason of the fact that the entire mechanically resistant armor is concentrated at the radially innermost zone of the cable in the form of a strand, the strand having only the size necessary to withstand all the stresses during the laying. The axis of the strand coincides with the longitudinal axis of the cable which, as is known, is the netural axis under the bending stresses.

Having reduced to the minimum the quantity of metal present per linear meter of cable, in addition to making the weight of the cable a minimum, thereby facilitating the laying operations, the quantity of hydrogen which can escape from said metallic material and get into contact with the optical fibers is reduced to the minimum. Consequently, the risk that the optical fiber can be "blinded" by the effect of said hydrogen is reduced to the minimum.

Finally, in a cable according to the present invention, the use of an electric conductor of good conductivity in parallel with the metallic armor, permits the use of the conductor and the metal sheath for feeding the optoelectronic repeaters of the signals transmitted by the optical fibers with electric power and avoids the need to rely on the sea surrounding the cable for the function of return conductor. In the cable of the invention, the dielectric function is carried out by the plastic material interposed between the armor and the metal sheath and not by a layer of plastic material covering the sheath. In the cable of the invention, the layer of plastic material covering the sheath, which is unavoidably subjected to the sea action, is not subjected to electrical stresses as in the known cables, and consequently, those electrochemical phenomena which lead to the formation of the so-called water-trees in said layer and to possible corrosion of the metal sheath itself are avoided.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A submarine, telecommunication cable comprising:
   an axially disposed and extending armor comprising a strand of wires, said strand having, by itself, a tensile strength sufficient to withstand the tensile stresses to which the cable is subjected during laying and recovery thereof;
   a plurality of tubes helically wound around and contacting said armor in circumferentially spaced relation to each other;
   a substantially incompressible fluid disposed in and filling-up any spaces within said armor including any spaces between said wires;
   at least one optical fiber loosely received in each of said tubes;
   a substantially incompressible fluid disposed in and filling-up the spaces between the interior of said tubes and said optical fibers; and
   a layer of plastic material around said tubes and said armor, the innermost surface of said layer of plastic material contacting said tubes and said armor and said layer filling the spaces between said tubes; and
   a water-tight metal sheath around the layer of plastic material around said tubes, said metal sheath, by itself, having a resistance to compression which is insufficient to withstand the compression forces to which the cable is subjected during use;
   said cable being without armor externally of said layer of plastic material which, by itself, can withstand the mechanical stresses to which the cable is subjected in use;
   whereby said cable is able to withstand hydrostastic pressures to which it is subjected when submerged without any armor outwardly of the optical fiber or fibers which by itself can withstand such pressures.

2. A submarine, telecommunication cable as set forth in claim 1, wherein said armor comprises a layer of plastic material surrounding and contacting said strand and wherein said tubes are in contact with said last-mentioned layer of plastic material.

3. A submarine, telecommunication cable as set forth in claim 1 or 2 wherein said wires are made of steel.

4. A submarine, telecommunication cable as set forth in claim 1 or 2 wherein said wires are made of an aromatic polyamide.

5. A submarine, telecommunication cable as set forth in claim 1 or 2 wherein said wires are made of carbon fibers.

6. A submarine, telecommunication cable as set forth in claim 1 or 2 wherein said armor further comprises a conductor having a conductivity greater than that of said wires.

7. A submarine, telecommunication cable as set forth in claim 6 wherein said conductor is made of copper.

8. A submarine, telecommunication cable as set forth in claim 1 or 2 wherein said tubes, by themselves, have a resistance to compression sufficient to withstand the compression forces to which the cable is subjected during use.

9. A submarine, telecommunication cable as set forth in claim 1 or 2 wherein said metal sheath contacts said layer of plastic material around said tubes.

* * * * *